July 29, 1941.　　　　E. A. GARDNER　　　　2,250,759
POULTRY WATERING FOUNTAIN
Filed Oct. 16, 1940
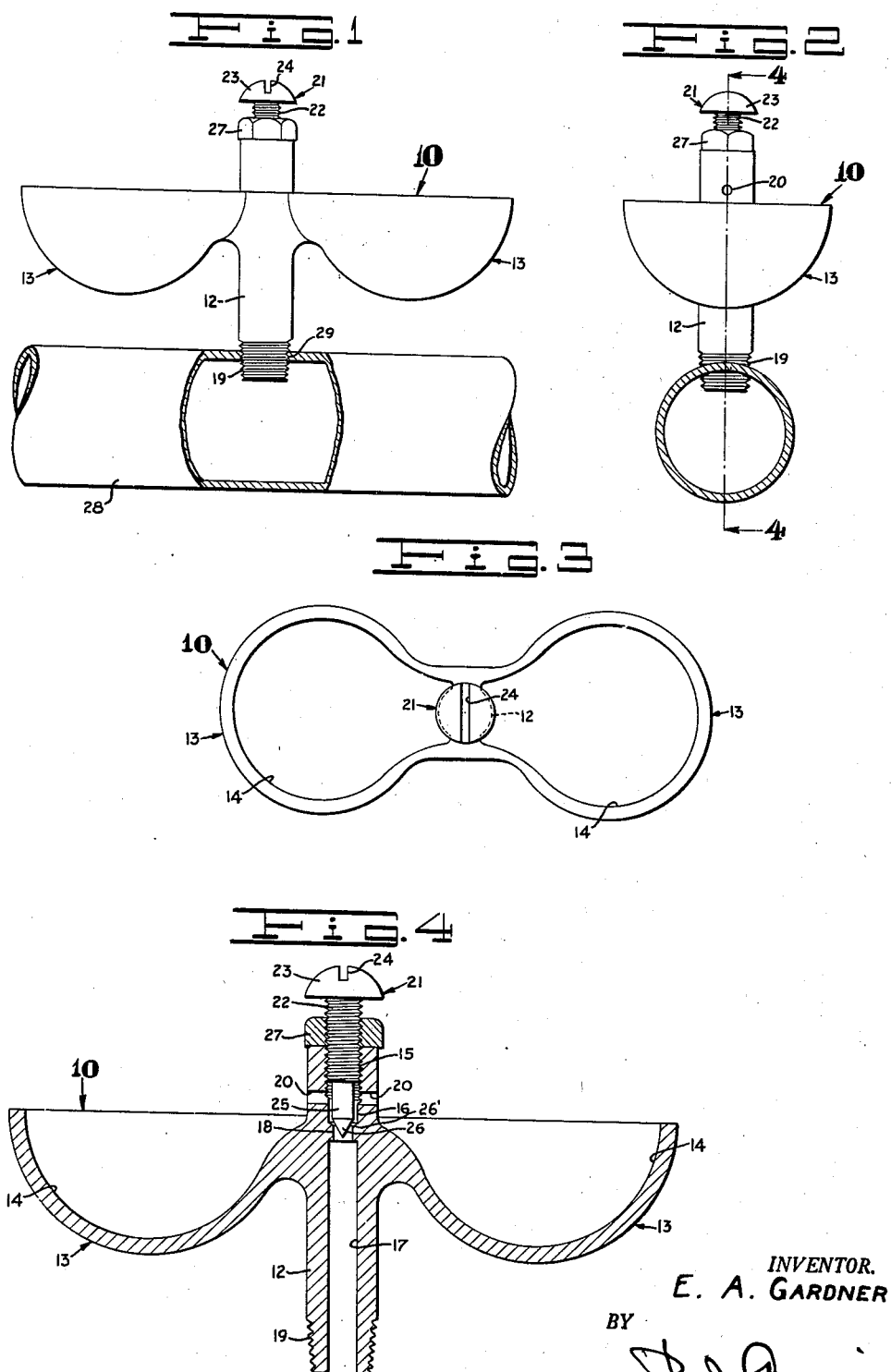
INVENTOR.
E. A. GARDNER
BY
B. J. Craig.

UNITED STATES PATENT OFFICE 2,250,759

POULTRY WATERING FOUNTAIN

Edgar A. Gardner, Los Angeles, Calif.

Application October 16, 1940, Serial No. 361,363

6 Claims. (Cl. 119—74)

This invention relates to improvements in poultry watering fountains.

The general object of the invention is to provide an improved continuous flow watering fountain for poultry.

Another object of the invention is to provide a novel non-cloggable fountain of the class described.

A further object of the invention is to provide a novel poultry watering fountain including an integral water receptacle and wherein water is directed into the receptacle from above the upper edge of the receptacle.

A still further object of the invention is to provide a simple one piece poultry watering fountain including means to control the flow of water therefrom.

Other objects and the advantages of the invention will be apparent from the following description taken in connection with the accompanying drawing wherein:

Fig. 1 is a side elevation of my improved poultry watering fountain showing it operatively mounted on a water supply pipe;

Fig. 2 is an end view of the device shown in Fig. 1;

Fig. 3 is a top plan view of the device shown in Fig. 1; and

Fig. 4 is an enlarged section through the fountain device taken on line 4—4, of Fig. 2.

Referring to the drawing by reference characters I have indicated my improved poultry watering fountain generally at 10. As shown the device 10 includes a stem portion 12 having a pair of opposed integral trough portions 13 thereon intermediate the length thereof.

Each of the trough portions 13 has a substantially semi-spherical open topped recess 14 therein.

Opening through the top thereof the stem 12 has a threaded recess 15 therein the lower end of which communicates with a co-axial reduced recess 16. The lower end of the recess 16 communicates with an enlarged recess 17 through a co-axial reduced aperture 18. The recess 17 opens through the lower end of the stem. Adjacent the lower end thereof the stem 12 is externally threaded as at 19.

Above the upper edges of the troughs 13 the stem 12 has a pair of opposed apertures 20 therein positioned at right angles to the axis thereof.

For adjustably controlling the flow of water into the troughs I provide a valve member 21 which includes a threaded shank 22 positioned in the threaded recess 15 of the stem. At the upper end the shank 22 has an enlarged head 23 thereon having a screw driver slot 24 therein. Opposite the head 23 the member 21 includes a reduced stem portion 25 the lower portion of which is tapered as at 26.

The stem portion 25 of the device 21 is positioned in the recess 16 and the tapered portion 26 thereof extends into the aperture 17.

When the device 21 is in its lowermost position the tapered portion 26 thereof engages the shoulder 26' at the juncture of the recess 16 and the aperture 17 and restricts passageway therethrough.

To retain the control device 21 in an adjusted position I may provide a nut member 27 on the shank 22 which is adapted to engage the upper end of the stem 12.

In Fig. 1 I have shown one method of installing one of the devices 10. As shown a water supply pipe 28 is drilled and tapped as at 29 and the threaded portion 19 of the stem 12 is screwed thereinto.

It will be understood however that various other methods may be used to connect the device 10 with a source of water supply.

After the device 10 has been installed on the water supply pipe the operator adjusts the control member 21 to allow a small trickle of water to pass the tapered end 26 and flow out of the apertures 20 into the trough recesses 14.

With the discharge orifices 20 above the water level in the troughs 13 foreign particles deposited in the troughs by the poultry cannot enter and clog the discharge orifices; thus a continuous predetermined flow of fresh water into the troughs is assured at all times.

From the foregoing description it will be apparent that I have provided a novel poultry watering fountain which is simple in construction and highly efficient in use and which tends to prevent colds and other diseases from spreading in a flock of poultry.

Having thus described my invention, I claim:

1. In a poultry fountain, a stem, a pair of oppositely extending integral trough portions intermediate the length of said stem, each of said trough portions having an open topped recess therein, said stem having a recess therein, means to supply water to said recess, and means above the fluid level in said trough portions to deliver water from the recess to the trough portions.

2. In a poultry fountain, a stem, a pair of oppositely directed integral trough portions intermediate the length of said stem, said stem having a longitudinal passageway therein, said stem having a pair of opposed transverse apertures therein communicating with said passageway and disposed above the fluid level of said troughs, and means to control flow of water from said longitudinal passageway to said transverse apertures.

3. In a poultry fountain, a stem, a plurality of integral trough portions intermediate the length of said stem, said stem having upper and lower recesses therein opening through the top and bottom thereof respectively, said stem having a co-axial reduced aperture therein affording communication between said upper and lower recesses, said stem having a plurality of transverse apertures therein above said reduced aperture and above the fluid level of said troughs, each of said transverse apertures being directed towards one of said troughs, adjustable means in said upper stem recess to control passage therefrom into said transverse apertures, and releasable means to lock said adjustable control means in an adjusted position.

4. In a poultry fountain, a stem, a laterally extending trough intermediate the length of said stem, said trough having an open topped recess therein, said stem having an upper and a lower recess therein opening through the top and the bottom thereof respectively, said stem having an aperture communicating with said upper and said lower recesses, said stem having an aperture above said first mentioned aperture and above the top of said trough, and directed towards said trough, a portion of said upper aperture being threaded, and a control device including a threaded shank positioned in said threaded portion of said upper aperture, said control device further including a portion adapted to control passage through said first mentioned aperture.

5. In a poultry fountain, a stem, a pair of oppositely directed trough portions intermediate the length of said stem and integral therewith, each of said trough portions having a hemispherical open topped recess therein, said stem having an axial recess therein opening through the top thereof and having a recess coaxial with the first recess and opening through the bottom thereof, said stem having a reduced aperture therein affording communication between said upper and said lower recesses, said stem having a pair of aligned opposed apertures, above said reduced aperture and above the tops of said troughs, said pair of apertures being positioned at substantially right angles to the axis of said stem and each directed towards one of said troughs, a portion of said first recess being threaded, a control device, said control device including a threaded shank positioned in said threaded portion of said upper recess, said control device further including a reduced stem portion having a tapered end thereon adapted to extend into said reduced aperture and control passage therethrough, and a nut member on said threaded shank adapted to engage the upper end of said stem to lock said control member in an adjusted position.

6. In a poultry fountain, a stem having an integral trough portion intermediate the length thereof, said trough portion having an open topped recess therein, said stem having a recess therein, means to supply water to stem recess and means above the fluid level in said trough portion to deliver water from the stem recess to the trough portion.

EDGAR A. GARDNER.